US011470782B2

(12) United States Patent
Laumann et al.

(10) Patent No.: US 11,470,782 B2
(45) Date of Patent: Oct. 18, 2022

(54) PICK-UP HAVING TINE RINGS AND TINE SEGMENTS

(71) Applicant: B. Strautmann & Söhne GmbH u. Co. KG, Bad Laer (DE)

(72) Inventors: Christopher Laumann, Harsewinkel (DE); Friedrich Quebe, Brockum (DE); Wolfgang Strautmann, Bad Laer (DE)

(73) Assignee: B. Strautmann & Söhne GmbH u. Co. KG, Bad Laer (DE)

(*) Notice: Subject to any disclaimer, the term of this patent is extended or adjusted under 35 U.S.C. 154(b) by 1045 days.

(21) Appl. No.: 16/077,841

(22) PCT Filed: Feb. 16, 2017

(86) PCT No.: PCT/EP2017/053528
§ 371 (c)(1),
(2) Date: Aug. 14, 2018

(87) PCT Pub. No.: WO2017/140797
PCT Pub. Date: Aug. 24, 2017

(65) Prior Publication Data
US 2021/0185930 A1 Jun. 24, 2021

(30) Foreign Application Priority Data

Feb. 19, 2016 (DE) .......................... 102016102916.5
Feb. 19, 2016 (DE) .......................... 202016104504.5
(Continued)

(51) Int. Cl.
*A01D 80/02* (2006.01)
*A01D 78/14* (2006.01)
*A01D 89/00* (2006.01)

(52) U.S. Cl.
CPC ............. *A01D 80/02* (2013.01); *A01D 78/14* (2013.01); *A01D 89/002* (2013.01)

(58) Field of Classification Search
CPC ....... A01D 80/02; A01D 78/14; A01D 89/002
See application file for complete search history.

(56) References Cited

U.S. PATENT DOCUMENTS 2,480,419 A * 8/1949 Patterson ............... A01B 9/003
172/532
3,126,693 A 3/1964 Renn
(Continued)

FOREIGN PATENT DOCUMENTS

DE 1158307 B 11/1963
DE 4223214 A1 9/1980
(Continued)

OTHER PUBLICATIONS

English Translation of DE 1158307B to Renn, [retrieved on Feb. 26, 2022], Retrieved from ESPACENET Website <https://worldwide.espacenet.com/patent/search/family/007404221/publication/DE1158307B?q=DE1158307b>. (Year: 1963).*
(Continued)

*Primary Examiner* — Thomas B Will
*Assistant Examiner* — Joan D Misa
(74) *Attorney, Agent, or Firm* — Laurence P. Colton; Smith Tempel Blaha LLC

(57) ABSTRACT

A rotatable pick-up device, which is installed or installable in an agricultural harvesting machine, for harvested crop, having a roller-shaped drum with an outer lateral surface that has an outside diameter, a multiplicity of tine rings that are arranged on the outer lateral surface of the drum and protrude over the outside diameter of the drum, intermediate spaces for receiving strippers provided between adjacent tine rings, and the tine rings have tine segments that, in the
(Continued)

mounted state, are arranged entirely above the lateral surface and are manufactured from an elastic plastic. The tine rings and the tine segments have mutually complementary fastening means, by means of which the tine segments can be mounted on the tine ring without the tine ring being removed.

12 Claims, 8 Drawing Sheets

(30) Foreign Application Priority Data

May 3, 2016 (EP) ..................................... 16168029
Aug. 19, 2016 (DE) ......................... 102016115396.6

(56) References Cited

U.S. PATENT DOCUMENTS

| | | |
|---|---|---|
| 4,189,907 A | 2/1980 | Erdman |
| 4,344,276 A | 8/1982 | Sund |
| 4,581,880 A * | 4/1986 | Klinner ................ A01D 43/10 56/364 |

FOREIGN PATENT DOCUMENTS

| | | |
|---|---|---|
| DE | 20017403 U1 | 1/2001 |
| DE | 10017984 A1 | 10/2001 |
| DE | 10021748 A1 | 11/2001 |
| DE | 202011002316 U1 | 4/2011 |
| DE | 102014117739 A1 | 6/2016 |
| EP | 0116514 A1 | 8/1984 |
| EP | 0224424 A1 | 6/1987 |
| EP | 2700296 A1 | 2/2014 |
| EP | 3028558 A1 | 6/2016 |

OTHER PUBLICATIONS

European Patent Office, Mittellung Europaischer Rercherchenbericht (search in a related application, Jan. 23, 2017.
Deutsches Patent—Und Markenamt, Search in a related application, Oct. 13, 2016.
Deutsches Patent—Und Markenamt, Rerchercheberich (search in a related application), Feb. 3, 2017.
WIPO/PCT, International Search Report (in a related application), dated Mar. 23, 2017.

* cited by examiner

PICK-UP HAVING TINE RINGS AND TINE SEGMENTS

CROSS-REFERENCE TO RELATED APPLICATIONS

This application is the US National Phase of, and claims the benefit of and priority on, International Application No. PCT/EP2017/053528 having an international filing date of 16 Feb. 2017, which claims priority on and the benefit of German Patent Application No. 10 2016 102 916.5 having a filing date of 19 Feb. 2016, German Patent Application No. 20 2016 104 504.5 having a filing date of 19 Feb. 2016, European Patent Application No. 16168029.3 having a filing date of 2 May 2016, and German Patent Application No. 10 2016 115 396.6 having a filing date of 19 Aug. 2016.

BACKGROUND OF THE INVENTION

Technical Field

The invention relates to a rotatable pick-up device, which is installed in an agricultural harvesting machine, for harvested crop. Such a pick-up device is also called pick-up below. The pick-up comprises a roller-shaped drum and a multiplicity of tine rings which are arranged on the drum and protrude over the outside diameter of the drum. Intermediate spaces for receiving strippers are provided between adjacent tine rings. The tine rings comprise tine segments made of an elastic plastic.

The invention furthermore relates to a tine segment, which is produced from an elastic material, for a pick-up device on an agricultural machine, such as a harvesting machine for stalk and leaf material, or a hay-making machine. The tine segment comprises a base with a fastening region for connecting the tine segment to the tine ring, and at least one individual tine protruding from the base.

Furthermore, the invention relates to a harvesting machine for stalk and leaf material, with the pick-up device mentioned and/or the tine segments mentioned. The harvesting machine can be, for example, a self-loading forage box, a baler or a field chopper, and suitable hay-making machines are, for example, windrowers (Merger).

Prior Art

A pick-up device of the type mentioned at the beginning has been disclosed in DE 100 21 748 A1. Protruding, individual feed tines, called fingers 16, are distributed on the drum 12 in such a manner that they form feed tine groups which are spaced apart from one another. An intermediate conveyor 14 which transfers the harvested crop to a stripper 28 engages between the fingers 16. The fingers 16 protrude directly from the lateral surface of the drum 12, i.e. are not connected to one another in the form of rings. The fingers 16 are manufactured from an elastic material, such as rubber, and are in the form of roller bodies widening in the direction of the drum. Accordingly, the intermediate spaces also widen in the direction of the tips of the fingers.

During harvesting use, the rotating drum picks up the harvested crop by means of the fingers. The harvested crop is deposited here between the fingers on the drum. In order to convey the harvested crop further, said harvested crop has to be detached from the pick-up and supplied to following units. Since only the fingers protrude from the lateral surface of the drum, problems may occur when harvested crop is deposited between radially adjacent feed tines on the lateral surface of the drum. Under some circumstances, the harvested crop can then not be entirely engaged below by the strippers, and the crop flow is disturbed.

Although DE 100 21 748 A1 has not described the manner of fastening the fingers 16 to the drum 12, the arrangement illustrated in the figures leads to the presumption that, in the event of relatively great mechanical loads, caused, for example, by foreign bodies, and dirt accumulations, the fingers 16 which are arranged directly on the drum 12 may, despite their elasticity, break at the contact point with the drum. This can lead to a considerable outlay on labor and interruption of operation during the insertion of new fingers.

A further pick-up device is known from DE 1158307 A. In the case of this pick-up device, each tine ring comprises two ring strips 31 and 34, of which the one is welded to the drum (carrier tube 16) of the pick-up device. A rubber strip which forms an anchoring ring 19 for the tines 22 is clamped between the two ring strips. The installation takes place by the tines first of all being plugged through holes provided in the rubber strip. The base of the tines has a thickened portion, the diameter of which is greater than the diameter of the holes through which the tines are plugged. The tines therefore cannot be entirely plugged through the rubber strip, but rather are held at their base. The rubber strip with plugged-in tines is laid around the carrier tube 16 and placed there with their one side on the wall of the fixedly welded ring strip 31. The second ring strip 34, which is arranged displaceably on the carrier tube, is subsequently pushed onto the anchoring ring 19, and therefore the rubber strip is clamped between the two ring strips. In addition, the ring strips each have a shoulder which protrudes over the respective edge of the rubber strip. Finally, the two ring strips are fixedly clamped to each other by clamping screw connections.

Although the tines of the described device are exchangeable, the replacement of a tine is highly complicated since the tine ring first of all has to be removed. After the ring strip 34 is released, the rubber strip as a whole has to be removed together with the tines plugged therein. Only then can one or more tines be exchanged.

Feed tines themselves are known in various embodiments. In addition to the feed tines already described and composed of an elastic material, double feed tines produced from a high-quality spring wire are frequently used.

DE 202011002316 U1 shows a crop pick-up with tines 14 produced from spring wire. The tines have a rectilinear part 14a and a spiral part 14b. The spring wire is designed in the central region in the form of a winding coil from which the ends of the spring wire protrude linearly and thus form the tine limbs. On account of the design, the functioning of said tines depends on the interaction of the spring action of the spiral part with the spring action of the rectilinear part, i.e. the tine limbs. If such double feed tines were produced from a different material, they would be significantly inferior to those of spring steel in respect of spring properties and service life. A disadvantage of said double feed tines is that the winding region of the double feed tines always has to be mounted in a region not acted upon by the harvested crop since otherwise the harvested crop may catch in the winding region of the double feed tines and would thus cause blockages and damage.

Double feed tines of this type are generally covered all the way round with strippers. Gaps which allow the limbs of the double feed tines to protrude are located between the strippers. Said strippers have the disadvantage of being expensive and furthermore make access to the double feed tines difficult, and therefore an exchange of feed tines in the event of repairs and maintenance work requires a considerable effort.

During use, the known individual and double feed tines have the property of, after yielding of the limbs, sometimes abruptly springing back under load or in the event of contact with the ground. This causes load peaks which may lead to damage in the fastening region or to the tines themselves. Furthermore, the vibrations caused by the abrupt removal of load reduce the service life of the feed tines.

Furthermore, the known double feed tines made from spring wire show a relatively aggressive behavior upon contact with the ground and may, for example, damage a sod located under the harvested crop to be picked up, by tearing said sod open.

It is furthermore disadvantageous that the spring force is substantially stored in the coil and not in the actual tine. In comparison to the coil, the limb of the tine is rather less flexible, depending on the quality of the material used, and therefore, when the limb or the tip of the limb strikes against a foreign body (e.g. a stone) lying on the ground, the coil of the double feed tine is tensioned. By contrast, the actual limb of the double feed tine remains in a rectilinear state. If the coil is now tensioned to such an extent that the stored force is greater than the force necessary for moving the object, the tine springs forward and abruptly moves the object which has previously been blocked. For example, stones or other foreign bodies can be torn out of the ground and catapulted into the surroundings or into the feed swath. Said stones upon striking may cause direct damage, for example to a towing tractor. Furthermore, they may be hurled into the swath or into the flow of harvested crop to be picked up and may be caught there. The foreign bodies then pass to the downstream working tools of the harvesting machine and may damage said tools and/or may remain in the feed or feed material and can thus endanger the health of animals who are intended to eat the feed at a later point.

In the case of the pick-up device already mentioned further above, DE 10021748 A1, the feed tines consist of individual fingers which protrude from the drum in a plurality of rows offset linearly on the circumference. The stripping work of the harvested crop from the fingers is performed by a rotating intermediate conveyor. The feed tines can be composed of rubber or of another resilient material and therefore have a ground-protecting property. However, they have a poorer feed property than the known double feed tines made from steel wire. In addition, harvested crop can accumulate in the region of the tine feet or of the drum casing since the intermediate conveyor illustrated has a comb-like action only in the outer region of the feed tines and the feed elements thereof do not reach to the drum casing. Furthermore, it is not disclosed whether and how individual fingers can be exchanged.

DE 10 2014 117 739 A1 discloses double feed tines produced from an elastic material. Said double feed tines each have a base 9 which is first of all loosely plugged into tine pockets 3 provided for this purpose and are then fixed by means of a screw connection. The tine pockets 3 therefore constitute depressions in the surface of the drum 2 for receiving the double feed tines. The production of such a drum with incorporated depressions is complex, and the pick-up device as a whole thereby has a complicated design.

BRIEF SUMMARY OF THE INVENTION

The present invention has been set the object of proposing a pick-up device for agricultural machines, which is insensitive to dirt and passes on the harvested crop with little resistance. Furthermore, it is the object of the invention to propose a pick-up device, in which the tine segments can be mounted simply and independently of one another. The feed tines themselves are intended to have a defined material quality and optimum spring properties and, by means of the shaping thereof, to permit simple installation or removal. Furthermore, the tine is intended to be produced in such a manner that it can partially yield upon striking against an object blocking it; in particular, the force acting on the tine by means of the object is intended not to be so abruptly discharged that said object is shot forward into the stalk and leaf material to be conveyed and catches therein.

The object according to the invention is achieved by a pick-up device, which is installed or installable in an agricultural harvesting machine, for harvested crop, comprising a roller-shaped drum with an outer lateral surface which has an outside diameter, a multiplicity of tine rings which are arranged on the outer lateral surface of the drum and protrude over the outside diameter of the drum, wherein intermediate spaces for receiving stripper are provided between adjacent tine rings, and wherein the tine rings comprise tine segments which, in the mounted state, are arranged entirely above the lateral surface and are manufactured from an elastic plastic, characterized in that the tine rings and the tine segments comprise mutually complementary fastening means, by means of which the tine segments can be mounted on the tine ring without the tine ring being removed; by a tine segment for a pick-up device on agricultural machines, such as harvesting machines for stalk and leaf material, or hay-making machines, wherein the tine segment is produced from an elastic plastics material, and the pick-up device is provided for picking up harvested crop lying on the ground, comprising a base with a fastening region for connecting the tine segment to the tine ring, and at least one feed tine protruding from the base, characterized in that the tine segment can be mounted on the tine ring by means of a latching and/or screw connection without the tine ring being removed; and by a harvesting machine for stalk and leaf material, or a hay-making machine, comprising a pick-up device as disclosed herein and/or tine segments as disclosed herein.

The tine rings form contours which protrude over the outside diameter of the drum and between which intermediate spaces remain which form substantially U-shaped, channel-like grooves. Since the harvested crop is generally composed of stalk-like structures and forms a type of carpet, it is supported, when it is detected by the feed tines during harvesting use, on the bases of the tine rings and penetrates only to a small extent, if at all, into the intermediate spaces. The intermediate spaces therefore remain free from feed and the entire harvested crop carpet can be engaged under by the strippers with little resistance.

Furthermore, it is essential that the tine rings and the tine segments comprise mutually complementary fastening means, by means of which the tine segments can be mounted and, when required, can be exchanged, without the tine ring being removed. Without the tine ring being removed should be understood in this connection as meaning that no fastening means holding the tine segments as a whole are provided for the installation of the tine segments. Such fastening means holding the tine segments as a whole differ from the fastening means according to the invention in that they do not permit the exchange of individual tines independently of one another.

The great advantage of a combination of:
    tine rings protruding over the drum diameter and tine segments which are coupled to the tine rings but can be mounted independently of the tine rings resides in the fact that, firstly, the crop flow during the picking up of harvested crop can take place with little resistance and, secondly, the system produced in such a manner is at the same time particularly maintenance-friendly.

In a first embodiment, one or more screw connections can be provided as fastening means between tine ring and tine segment. The tine ring here can either be an independent component, onto which the tine segments are screwed, or the tine ring can be formed by tine segments which are screwed to one another. The complementary fastening means are therefore screws and nuts or threaded bores. The threaded bores can also be arranged directly in the drum. In this case, the tine segments are therefore screwed onto the drum. Also in this embodiment, it is essential that in each case a number of tine segments on the drum form an annularly closed contour with channel-like grooves lying in between for the strippers, and the tines can be added and taken away without other parts being removed.

In the case of a tine ring having a total of eight individual tines, the two ring parts preferably each have four individual tines. If three ring parts and, for example, nine individual tines are provided, each ring part preferably has three individual tines. Furthermore, it can be provided that the number of the ring parts corresponds to the number of the individual tines, i.e. each ring part is in each case equipped with one feed tine.

A tine ring embodiment in which tine-free intermediate segments are provided in addition to the tine segments, or between the latter, is particularly preferred. Tine-carrying segments and tine-free intermediate segments then together form a tine ring. The use of additional intermediate segments is of particular advantage because standardization of the tine segments is thereby permitted.

It is advantageous if the feed tine is manufactured in one material piece together with the base. A design made from an elastomeric synthetic plastic, for example polyurethane (PUR) or silicone rubber, is preferred. Said elastomers which are selected specifically for the feed tines are distinguished by a very good sliding property. Of course, the intermediate segments can also be manufactured from such elastically deformable thermoplastics. Since, however, the elastic property or the resilient action is not absolutely required for the intermediate segments, it is also possible to produce the intermediate segments from a more cost-effective plastic or from another material. Furthermore, it is possible to set the elasticity of the entire tine segment in the production process in such a manner that the tine base or the base is less elastic than the feed tine or the tip thereof.

In a particular embodiment, the feed tines and the bases are connected releasably to one another. The releasable connection can be realized, for example, by the base having a bore with a threaded bushing inserted or vulcanized therein, and the feed tine itself being provided with a corresponding thread at its end. To this extent, different materials can be selected for the base part and the feed tine itself, for example a less elastic plastic for the base part and an elastic, high-strength plastic for the feed tine itself.

In a preferred embodiment, the tine segments and the intermediate segments, if such are provided, have an inside radius which is half the size of the outside diameter of the drum. A tine ring mounted on the drum therefore surrounds the drum in a play-free manner and the individual parts can easily be mounted.

For a rapid releasable attaching of the tine rings to the drum, it is advantageous if the tine segments and intermediate segments form part rings, for example half rings, which have already been preassembled. Said part rings can either consist of tine segments which have been mounted together, or can already be produced as a single piece.

In an advantageous embodiment, the tine rings on the drum are spaced apart to differing extents from one another. Such a design is made possible by the fact that, in the case of the pick-up device according to the invention, the use of individual tines is possible. In the case of the pick-up devices known as prior art, what are referred to as double tines composed of spring steel wire are generally used. Such double tines have a central winding coil which peters out on both sides in an elongate end, the actual tine. The use of such double tines has the consequence that, when uniform tines are used over the entire pick-up drum, the distances between the tines in the axial direction of the drum are always identical. Since all of the tines are identical, but the loading occurring during harvesting use in the central region of the pick-up device, i.e. the point at which generally most of the harvested crop is to be picked up, is at the greatest, the load acting on the individual tines differs.

In the case of the pick-up device according to the invention, the distance between the tines can be adapted to meet requirements. It can be provided in particular that the distance between two tine rings in the central region is smaller than in the edge regions. By this means, the load in the central region of the pick-up drum is distributed to a greater number of feed tines and is therefore reduced for the individual tine. As an alternative thereto or in addition, it can also be provided that the distance between the outermost lateral tine rings is reduced in order thereby to relieve the load on the tines which are arranged there and may be exposed to increased loading during cornering.

In a further embodiment, it is provided that the fastening means form a latching connection between tine ring and tine segment. A latching connection is understood as meaning a connection in which a force-fitting/interlocking connection is at the basis of holding together the parts. The structural features of a latching connection are, for example, hooks, studs or beads on one of the two parts which are to be connected and which, after the connection to the other part, latch into corresponding depressions, recesses or undercuts of the other part.

The tine segment with latching connection preferably comprises a single individual tine protruding from the base, and two extension arms.

The tine segments are designed in such a manner that, in the mounted state, one of the extension arms points in the direction of rotation of the drum with respect to the tine center axis. The other extension arm points in the opposite direction.

The latching connection according to the invention is formed by at least one latching element which is preferably arranged in the end region of the extension arms and interacts with a compatible latching element provided on the tine ring. The latching connection is therefore produced in the manner of a click system, preferably without a tool.

The extension arms and/or the latching element are elastically deformable, and therefore a releasable latching connection can be realized between the tine segment and the tine ring.

The latching connection can be realized, for example, by the base of a tine segment having a contour which is compatible with a recess in the tine ring and forms an interlocking connection. The interlocking connection can be designed in such a manner that the base of the feed tine is firstly supported on the tine ring during rotation of the drum during working use, i.e. during the conveying of harvested crop, and secondly is releasable during reverse loading.

In a preferred embodiment, the base of a tine segment has at least one groove which divides the base into the two extension arms. When force acts on an extension arm in the direction of the groove, the deformability of at least one extension arm is thereby facilitated, and therefore the feed tine which is elastically deformed into the region of the groove can be taken out of its interlocking connecting point. This is of advantage in particular if the tine segment is inserted in a substantially interlocking manner in a depression contour provided on the tine ring. In such a case, the elastic deformation requires a very high amount of force since the although basically deformable material of the tine segment cannot yield in any direction, but rather is in the extreme case deformable only by means of compression. The additionally provided groove therefore produces a free space into which part of the extension arm can be deformed upon an action of force.

In order to prevent the tine segment from being released unintentionally, for example by a large load force exerted by the harvested crop during working use, a bore opening into the groove can be provided in the base of the tine segment. Said bore serves for receiving a stopper blocking the deformability of the extension arm. As has already been mentioned, the holding force of the tine segment in the pick-up device is dependent in particular on whether and in which direction the extension arms can be deformed in the mounted state. By means of the bore and a stopper inserted into the bore, the tine segment can therefore be securely held during working use and, after the stopper is removed, can be exchanged if required. As an alternative to the securing by means of a stopper, securing with a screw can also be provided.

The latching element can be provided with more or fewer aggressively acting contour shapes depending on the desired response threshold to be realized. For example, a rounded portion can be provided as the latching element in order to predefine a response threshold which can be triggered with a relatively low force requirement, or a prong can be provided which predefines a response threshold which can be triggered with a relatively large force requirement. Of course, other geometrical configurations or the combination of a plurality of contour elements are also suitable for forming the latching element.

It is furthermore particularly preferred if not only a single, but rather two latching elements are provided on the tine segment. In particular whenever in each case one latching element is mounted on one extension arm in each case, the tine segment in the mounted state can be securely held in the two directions of rotation coming into consideration of the pick-up device.

It is furthermore of advantage if the at least two latching elements have different response thresholds such that, when a tine segment is mounted on the pick-up device, the tine segment is releasable from the pick-up device depending on the direction of action of a force acting on the tine segment. If the tine segment is used, for example, on a pick-up device which basically conveys harvested crop in one working direction of rotation and is only loaded a little, if at all, in the other direction of rotation, the one response threshold in the event of an action of force in the working direction of rotation can be defined to such a high level that the triggering requires a very high force requirement or is even entirely prevented. By contrast, the other response threshold which triggers the tine segment in the event of an opposite action of force can be predefined to be very low, and therefore the removal of the tines is made possible by small action of force in the opposite direction to the working direction of rotation. By this means, the tine segment is securely held during working use, but can nevertheless be simply replaced or removed.

The different response thresholds can be realized by different contours of the latching elements and/or by different lengths of the extension arms. A rounded latching element and/or a short extension arm length can thus be provided in order to predefine the one response threshold with a low force requirement for the triggering. The other response threshold, in which a high force requirement is intended to be predefined for the triggering, can be formed by a latching element with a prong and/or with a large extension arm length.

In a preferred embodiment, the feed tine of a tine segment according to the invention has a contour tapering conically from the base to a tip provided on the feed tine. A greater force is therefore necessary in the region of the tine foot than in the region of the tine tip in order to bend the individual tine. The individual tine is therefore more elastic at its outer end (facing the loading material) than at its end in the region of the base.

The feed tine can also be prismatic, partially prismatic, roller-shaped or partially roller-shaped. It preferably has the shape of a truncated obelisk which tapers in the direction of the tip and the two opposite side surfaces of which are flat and parallel to each other.

The feed tine can be oriented radially or at an inclination, preferably at an inclination in a trailing manner, in relation to the base.

A tapering, in particular conical, contour of the feed tine has the advantage that such a tine, in particular in the region of the tip, can be substantially more flexible than a conventional feed tine made from steel wire. The known double feed tines made from spring wire are wound from a wire with a constant diameter. This design principle rules out a conical configuration of the rectilinear tine end.

While, in the case of the double feed tines made from steel wire, when the tine tip strikes against a foreign body, the energy is stored in the spring coil and the front tip of the steel wire can bend very slightly in order, for example, to be able to avoid a foreign body, the tine according to the invention yields substantially more easily upon striking against a foreign body. The energy is stored in the individual tine itself.

The result is that, upon striking against a foreign body, the tine formed from an elastic plastic with a tapering shape avoids the foreign body or is moved by the latter. A double feed tine made from steel wire with a winding coil or, by contrast, a tine produced from steel wire with an elastic tine foot substantially stores the introduced energy in the winding coil or in the elastic tine foot and releases said energy abruptly when a force threshold is exceeded.

In a further embodiment, a combined latching and screw connection between tine ring and tine segment can be producible by means of the fastening means. In this connection, a tine segment has two extension arms which are preferably oriented in the radial direction of rotation of the pick-up device. The one extension arm is coupled to the tine ring by means of an interlocking or a force-fitting and interlocking connection. By this means, the tine segment is preferably fixed in all directions, with the exception of the direction from which said tine segment is plugged onto the tine ring.

The remaining possibility of movement is blocked by a screw connection on the second extension arm of the tine segment. The second extension arm is coupled to the tine ring directly by means of a screw connection (screw passes through a bore provided in the extension arm) or indirectly (extension arm is held by a screwed-on clamping plate). As a result, when the screw connection is released, the tine segment can be plugged onto the tine ring and, when the screw connection is mounted, is fixed on the drum. This makes it very easily possible to mount the tine segments. In particular, it is possible to securely fix a tine segment with a single screw.

In a further embodiment, the tine ring comprises support plates and carrier plates, wherein the support plates are arranged perpendicularly in relation to the drum and, together with the carrier plates, form a T-shaped contour protruding over the drum. Support plates and carrier plates are composed here of metal and are preferably connected to the drum nonreleasably, in particular in an integrally bonded manner by being welded thereon. The tine rings therefore sit fixedly on the drum. Since the tine segments are also removable in this embodiment independently of the tine rings, the tine rings do not need to be removable in order to exchange a tine segment. A drum with tine rings welded thereon can be produced cost-effectively and is highly stable.

The annular contour of the tine ring can have wedge-shaped receptacles for the tine segments. Analogously thereto, the tine segments in this case have wedge-shaped extension arms, the shape and angle of which is adapted to the wedge-shaped receptacle in the tine ring. As an alternative thereto, other geometrical shapes, for example rounded receptacles, are also possible. It is important for the receptacles which are provided on the tine ring to be compatible with the contour provided for the tine segments.

An embodiment is particularly preferred in which an extension arm of a tine segment has a slot which, when the tine segment is pushed into the receptacle of the tine ring, grips on a contour element, which is compatible with the slot, of the tine ring. Said contour element can be, for example, a lug-like projection on the tine ring. By means of the contour of the extension arm, in particular by means of a wedge-shaped contour which engages in a corresponding contour of the tine ring, the tine segment is fixed in the radial direction. The additional slot which is likewise arranged in the radial direction is pushed onto the corresponding contour element on the tine ring and fixes the tine segment in the transverse direction such that lateral yielding of the tine segment during working use can be suppressed.

The tine ring preferably has an outer radius which is larger than the radius of the stripper in the front region of the pick-up device, as seen in the direction of travel. When the pick-up device is in working use, the harvested crop to be picked up first of all makes contact with the rotating tine ring and is carried along by the latter. Only then does the harvested crop make contact with the strippers since the latter stand back somewhat behind the tine ring because of their smaller radius. In this case, the radius of the tine ring should be understood as meaning the distance of the tine ring center axis from an outermost point of a tine ring without inserted feed tines. The flow of the harvested crop is therefore promoted by the fact that the harvested crop first of all strikes against surface regions of the tine rings rotating with the drum. Since the strippers do not rotate with the drum, but rather on the contrary are substantially rigidly fixed to a supporting frame, they brake the crop flow to a certain extent while those regions of the tine rings which protrude over the strippers can carry along and even accelerate the harvested crop.

In a further preferred embodiment, the strippers are fastened with their one side on the frame of the pick-up device and at the same time have a free end which is not only, as in the case of the comb-like strippers already mentioned, guided as far as the surface of the drum, but on the contrary loops around the drum at least to an extent such that the free end of the strippers cut through a horizontal plane defined by the centerpoints of the tine rings. The tip of the strippers is therefore not inserted into the feed flow of the harvested crop, but rather stands at least substantially perpendicularly to the harvested crop flow, which is guided substantially horizontally to the pick-up drum. Put in simplified terms, the harvested crop flow strikes against the radial surface and not against the tips of the strippers, and therefore the strippers are pressed overall in the direction of the drum.

This effect occurs if the ends of the strippers break through at least the horizontal plane mentioned. However, the strippers preferably loop even further around the drum. The angle at which the strippers additionally loop around the drum starting from said horizontal plane can be 0° to 160°. Said angle is preferably 40° to 120° and most preferably 70° to 120°. In the optimum range, a stripper is not bent around with or by the harvested crop flow, even under unfavorable use conditions, since said stripper is positioned against the drum in a dragging manner under load. At the same time, similarly as in the case of a pick-up device with a comb-like stripper, a free space is provided in the lower rear region of the pick-up device between the stripper ends and the frame of the pick-up device. Harvested crop particles which have been unintentionally not passed on by the feed tines with the harvested crop flow, but rather have been carried along as the feed tines enter between the strippers, can thus at least drop unobstructed onto the ground. The risk of clogging or material accumulations in the pick-up device is thereby reduced.

The invention also relates to a harvesting machine for stalk and leaf material, or hay-making machines, which is equipped with the described pick-up device and/or with the described tine segments.

BRIEF DESCRIPTION OF THE DRAWINGS

The invention is described below and illustrated in the drawings.

DETAILED DESCRIPTION OF PREFERRED EMBODIMENTS

Figure 18:
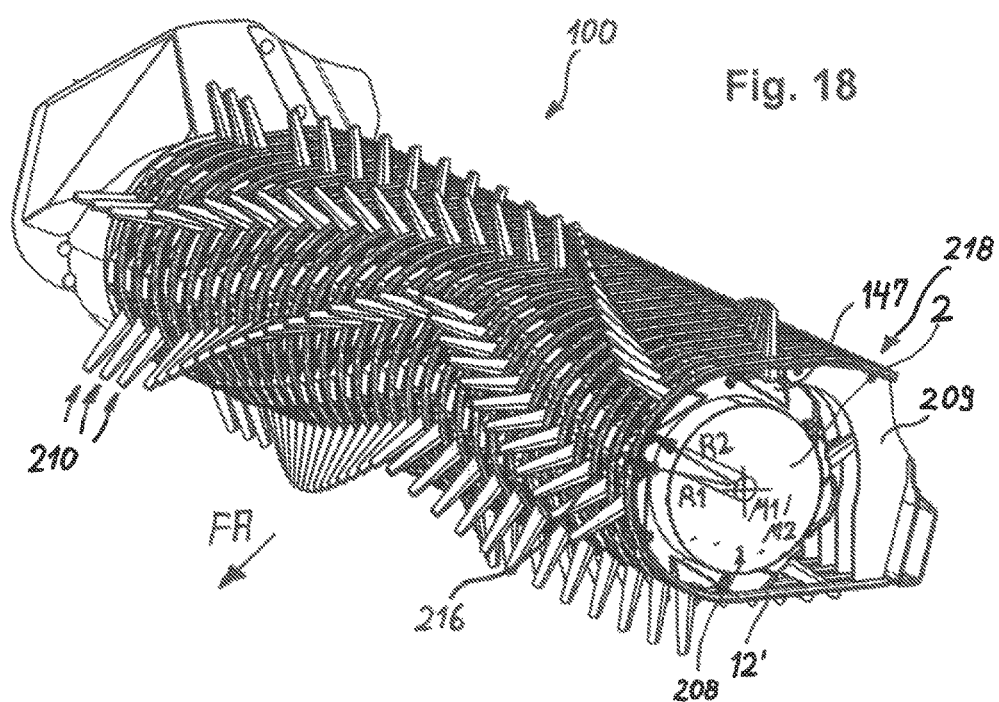
FIG. 18 shows a further embodiment of a pick-up device which has an encircling stripper and in which fastening means are provided which realize a combined latching/screw connection between tine ring and tine segments.
Figure 21:
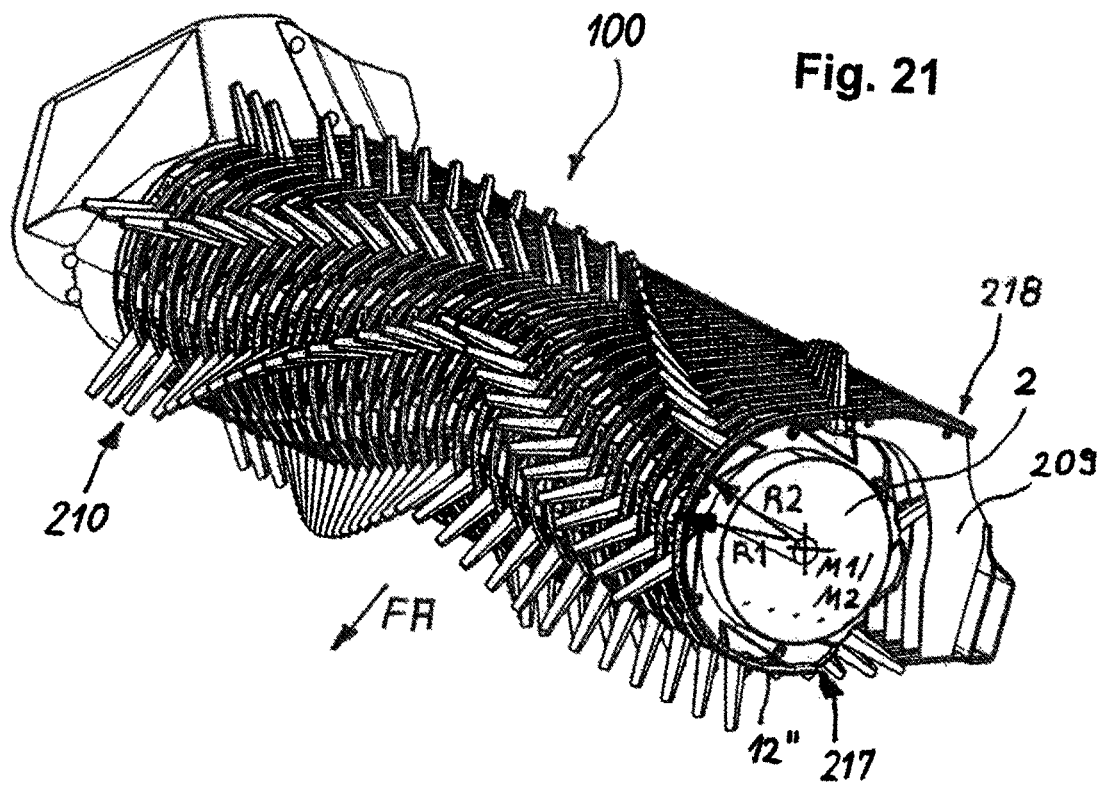
FIG. 21 shows a further embodiment of a pick-up device which, in contrast to the embodiment illustrated in FIG. 18, has strippers which only partially loop around the drum.
Figure 22:
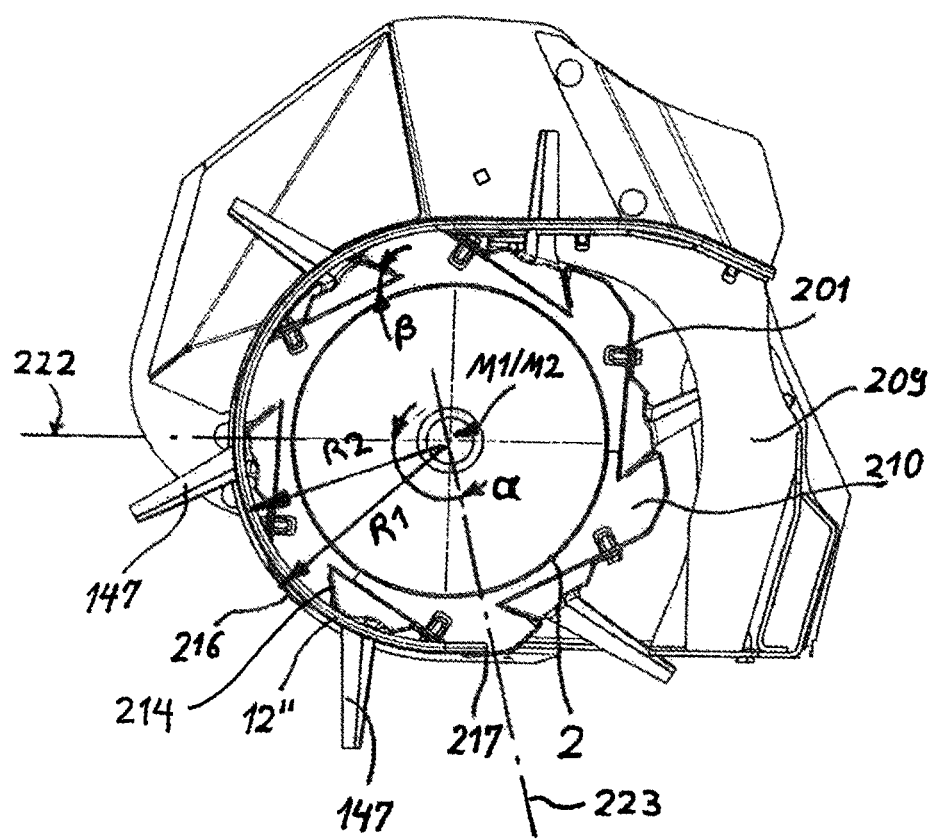
FIG. 22 shows the pick-up device according to FIG. 21 in a side view (sectional illustration).

Identical or similar elements can be provided with the same or similar reference signs in the figures below. Furthermore, the figures of the drawing, the description thereof and the claims contain numerous features in combination. It is clear to a person skilled in the art that said features can also be considered individually or they can be combined to form further combinations which are not described in detail here. For example, all of the embodiments of the pick-up devices according to the invention can either have comb-shaped strippers 12, as illustrated, for example, in FIG. 3, 7, 8 or 15, or encircling strippers 12', as are illustrated in FIG. 18, or partially encircling strippers 12", as illustrated in FIGS. 21 and 22.

Figure 1:
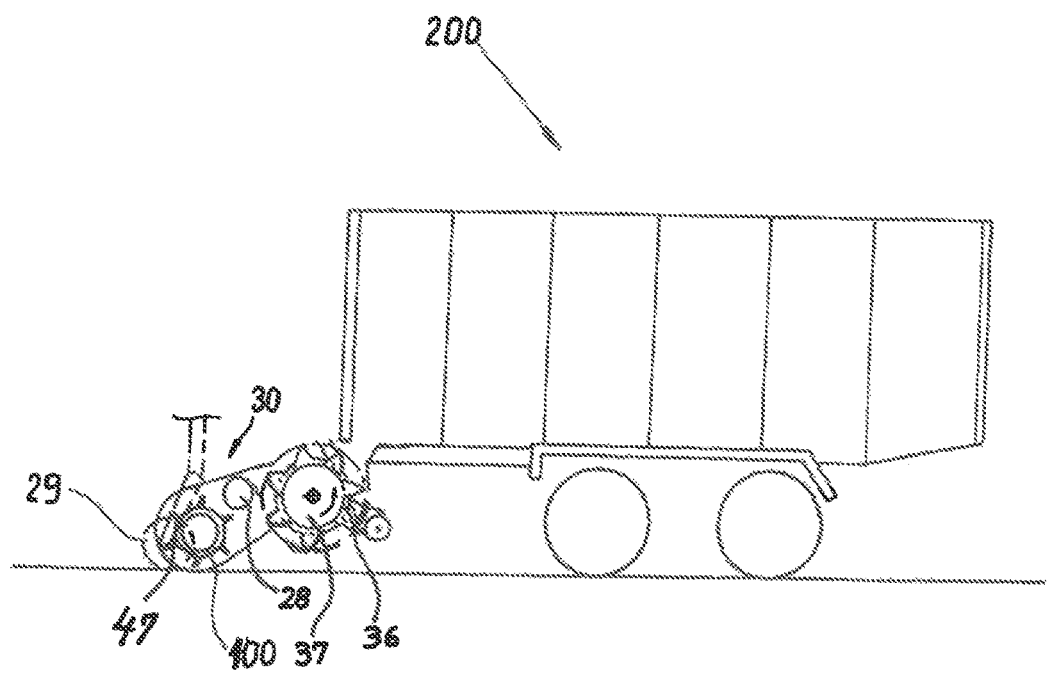
FIG. 1 shows a harvesting machine in the form of a self-loading forage box with a pick-up device in a schematic side view.
Figure 2:
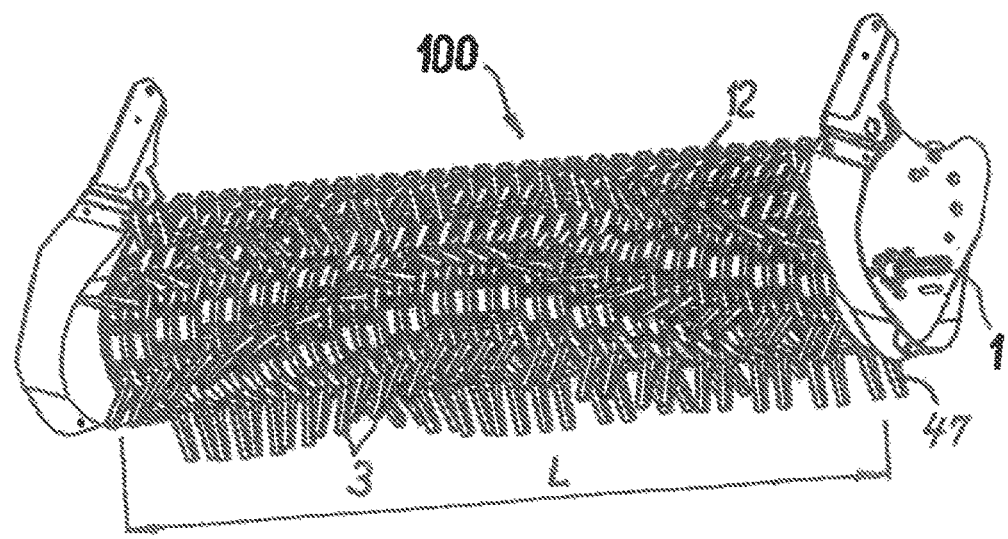
FIG. 2 shows the pick-up device from FIG. 1 in a perspective view.

FIG. 1 illustrates an agricultural harvesting machine 200, here: a self-loading forage box with what is referred to as a continuous-flow-system loading unit 30 (CFS), containing a pick-up device 100, shown in detail in FIG. 2. Furthermore, reference number 28 refers to a supply roller which is known per se, also called a CFS acceleration roller, and 29 denotes a support wheel. The CFS loading unit 30 furthermore comprises a cutting device 36 with a conveyor rotor 37, a roller hold-down device and feeler wheels.

FIG. 2 shows the pick-up device 100 which comprises an elongate, roller-shaped drum 2 with a length L and which is mounted on a driveshaft 1. A multiplicity of tine segments 47 are mounted on the drum 2. The tine segments 47 have feed tines 3 which, when the drum 2 rotates during working use, lift up harvested crop from the ground and convey said harvested crop further. Strippers 12 in a comb-like formation are mounted between the tine segments 47. The harvested crop which is picked up by the feed tines 3 during harvesting use is substantially deposited on surfaces 17 of the tine rings 10 and bridges the intermediate spaces 11 here. This has the effect that the harvested crop forms a carpet-like structure which can easily be engaged under with little resistance by the tips 38, which run through the intermediate spaces 11, of the strippers 12 and can be raised and conveyed further.

Figure 3:
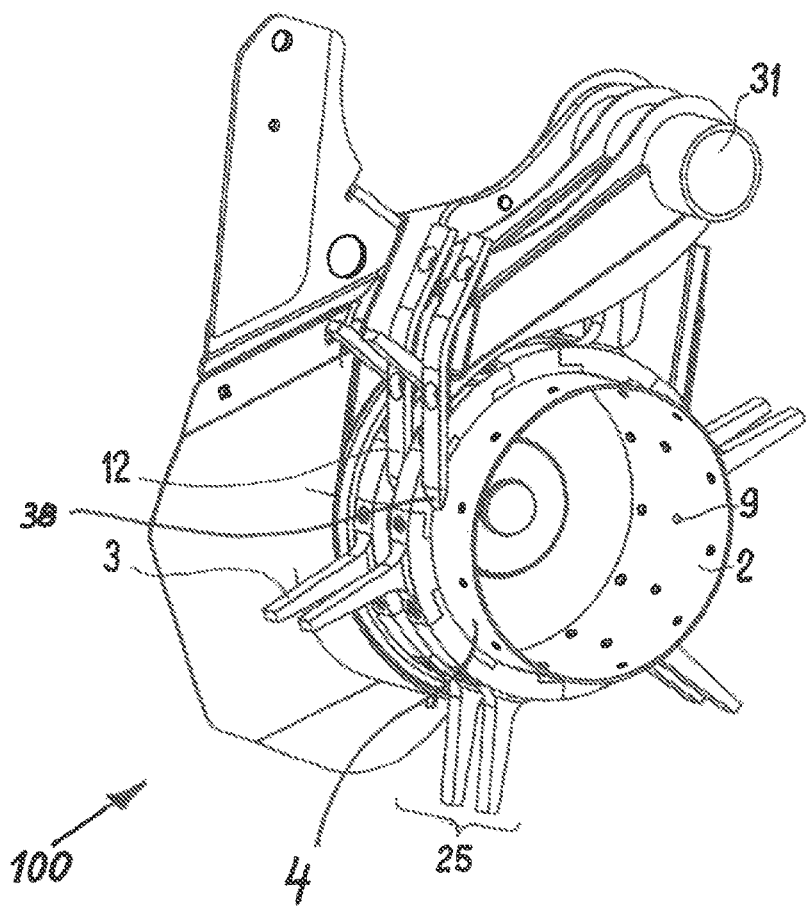
FIG. 3 shows a cutout of a pick-up device with tine rings screwed onto the drum.

FIG. 3 shows a pick-up device 100 in an illustration in the manner of a partial section. In the exemplary embodiment illustrated in FIG. 3, the drum 2 is round; however, it can also have a different contour, in particular a polygonal contour (cf. inner contour of the tine ring 10' illustrated in FIG. 10). Feed tines 3 protruding over the lateral surface 4 are arranged on the drum 2. The feed tines 3 are distributed on the drum 2 in such a manner that they form a plurality of tine rings 10 which are spaced apart next to and from one another and between which an annular intermediate space 11 is in each case arranged. The intermediate space 11 forms a U-shaped, channel-like groove 39 in which the tip 38 of the tine-shaped stripper 12 engages or enters (cf. FIGS. 7 and 8). The strippers 12 are arranged on a shaft 31 in the manner of a comb and reach as far as the lateral surface 4 of the drum 2. As an alternative to comb-like strippers 12, strippers 12' looping around the drum 2 (cf. FIG. 18) or partially encircling strippers 12" (cf. FIGS. 21 and 22) can also be provided.

Figure 4:
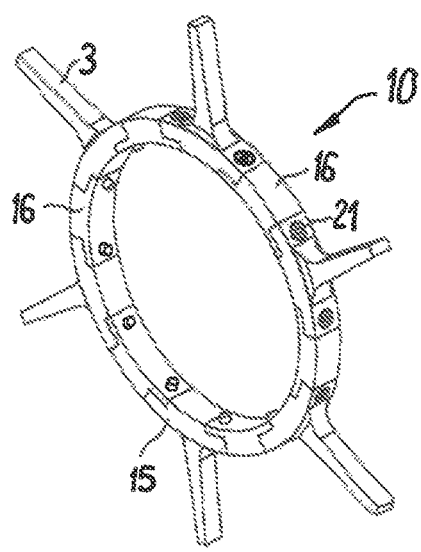
FIG. 4 shows a tine ring according to FIG. 3 in a perspective view.

FIG. 4 shows a tine ring 10 which consists of an equal number of tine segments 15 (cf. FIG. 5) and intermediate segments 16 (cf. FIG. 6) arranged in an alternating manner. Furthermore, it can be gathered from FIG. 4 that the tine ring 10 has plane-parallel side surfaces. The effect achieved by the parallelism of the side surfaces is that the intermediate space 11 between adjacent tine rings 10 is rectangular in its cross section and forms virtually no free spaces for the accumulation of dirt. During working use, the stripper 12 slides along the side surfaces of the tine rings 10 and at the same time brushes over the lateral surface 4 of the drum 2.

Figure 5:
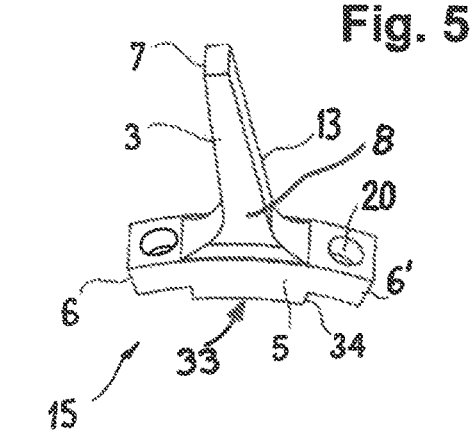
FIG. 5 shows a tine segment of the tine ring according to FIG. 4 in a perspective view.
Figure 6:
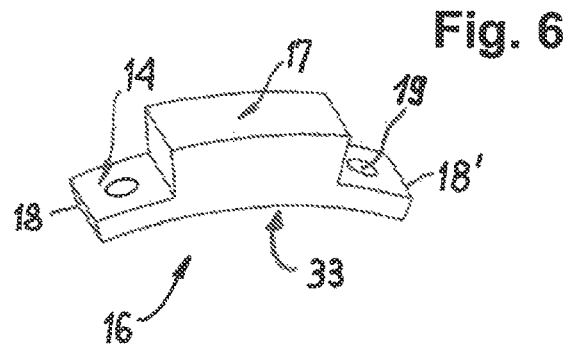
FIG. 6 shows an intermediate segment of the tine ring according to FIG. 4 in a perspective view.
Figure 7:
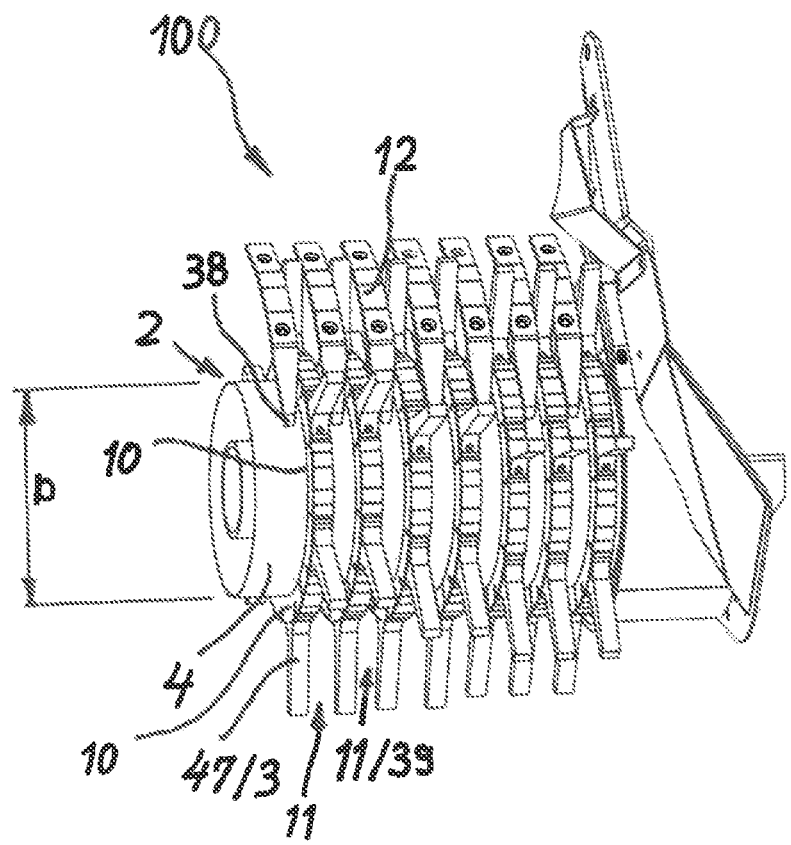
FIG. 7 shows a cutout of a further embodiment of a pick-up device with tine rings welded onto the drum and tine segments mounted on said tine rings.
Figure 8:
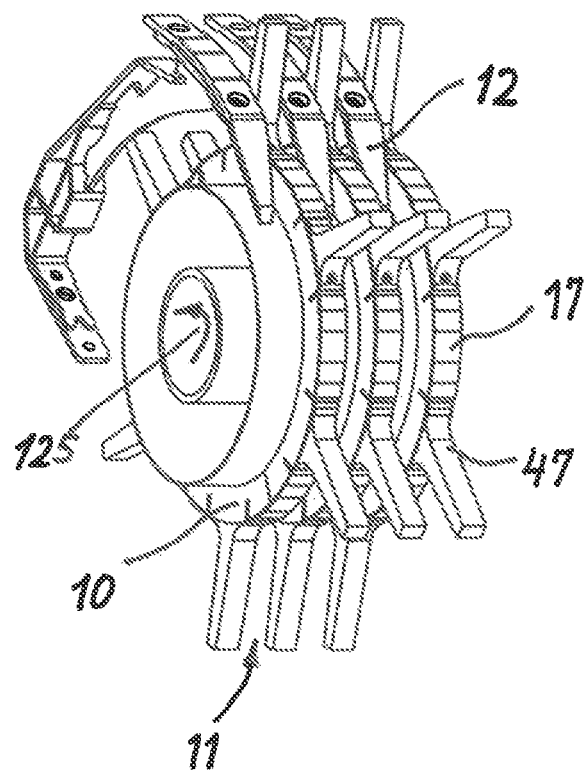
FIG. 8 shows a cutout of the pick-up device according to FIG. 7 in a partially sectioned illustration.

As FIGS. 5 and 6 show, the tine segments 15 and the intermediate segments 16 have a curved inner surface 33 which is adapted to the contour of the drum 2. The inner surface 33 of the tine segment 15 merges via steps 34 into two shoulders 6, 6', on which a two-stage, continuous bore 20 is in each case provided.

The base 5 and the feed tine 3 form a tine segment 15 of the tine ring 10 surrounding the drum 2. The tine segment 15 which is produced is composed of a thermoplastic, elastomeric plastic, such as synthetic rubber, rubber or resin and, in the exemplary embodiment illustrated, is manufactured in one material piece as a shaped part. As an alternative to the single-piece design of the tine segments 15, a two-part design comprising a base 5 and a feed tine 3 is also possible. In such a design, a preferably releasable connection, for example in the form of a threaded connection (not illustrated), is provided between feed tine 3 and base 5. The feed tines 3 are oriented in an inclined manner in relation to the base 5 (cf. in particular FIG. 14).

The intermediate segment 16 has a shape compatible with the tine segment 15, as can be deduced from FIGS. 5 and 6. Intermediate segment 16 and tine segment 15 have the same width, and therefore the tine ring 10 as a whole also has a constant width. The compatibility of intermediate segment 16 and tine segment 15 secure two arms 18, 18' which are set back in relation to a curved surface 17 of the intermediate segment 16. The curvature of the surface 17 can be seen, for example, in FIG. 6. The arms 18, 18' each have a curved supporting surface 14 in which the shoulder 6, 6' of the base 5 is supported in the assembled state of the tine ring 10.

A continuous bore 19 which, in the assembled state of the tine ring 10, coincides with the bore 20 of the base 5 is provided on each arm 18, 18'. The bore 20 is of two-part design, and therefore a screw connection by means of a countersunk head screw 21, preferably with a hexagon socket, is made possible, and the screw head does not protrude over the surface 17 of the tine ring 10 in the mounted state. The tine ring 10 has a closed contour with a substantially constant thickness d, from which the feed tines 3 protrude (cf. FIG. 4).

To facilitate the installation, tine segments 15 and intermediate segments 16 can also be preassembled to form partial rings or half rings (not illustrated). The connection of the individual tine segments 15 and intermediate segments 16 to one another to form a partial ring is possible, for example, by the bores 19 on the arms 18, 18' of the intermediate segment 16 being provided with a thread for the countersunk head screw 21. However, the tine segments 15 and intermediate segments 16 of a partial ring can also be adhesively bonded to one another.

As FIG. 3 shows, in this embodiment numerous bores 9 are provided on the drum 2, said bores facilitating the interchangeability of the tine ring 10, the partial ring 27 or the individual segment 15.

The bores 9 on the drum 2 can be designed with or without a thread. In the case of thread-free bores 9, only the tine segments 15 and intermediate segments 16 are screwed to one another to form a tine ring 10, and the countersunk head screws 21 are embedded in the bores 9—forming an interlocking connection.

In the exemplary embodiment illustrated, the bores 9 are distributed in a wave- or spiral-like manner over the entire drum length L in such a manner that, in the mounted state, the feed tines 3 also have a wave-like or spiral winding line or contour (cf. FIG. 2). The spiral-shaped profile of the feed tines 3 reduces load peaks which could occur in the case of a linear arrangement. Furthermore, the spiral-shaped profile of the feed tines 3 has a feed action directed from the center to the outside. By this means, a harvested crop swath which is to be picked up and generally drops from the swath center to the sides is at least somewhat equalized. However, it is not ruled out that the feed tines 3 are not arranged in winding lines, but rather linearly, on the drum.

It should be noted that, in the exemplary embodiment illustrated, not only the tine segments 15 but also the intermediate segments 16 and the tine-shaped strippers 12 are manufactured from plastic.

The tine segments 15 and the intermediate segments 16 are fastened releasably to the drum 2. This permits simple and rapid exchange of a tine segment 15 when required.

The tine rings can be spaced apart to different extents from one another. For example, it can be provided that the distance between the tine rings is smaller in the central region than in the outer region.

Alternatively to a round drum 2, the pick-up device 100 can also have a drum with a polygonal contour. In the case of a drum with a polygonal contour, the tine rings have an inner contour which is compatible therewith and likewise forms a polygon (cf. FIGS. 9, 10 and 12). The polygon is star-shaped and, in the example illustrated, has twelve inwardly pointing and twelve outwardly pointing corners. The drum 2 is manufactured from sheet-metal segments having six edges. The advantage of a drum with a polygonal contour is that tine ring and drum are thereby coupled in an interlocking manner to one another and therefore a means of securing the tine rings against rotation is formed.

Figure 9:
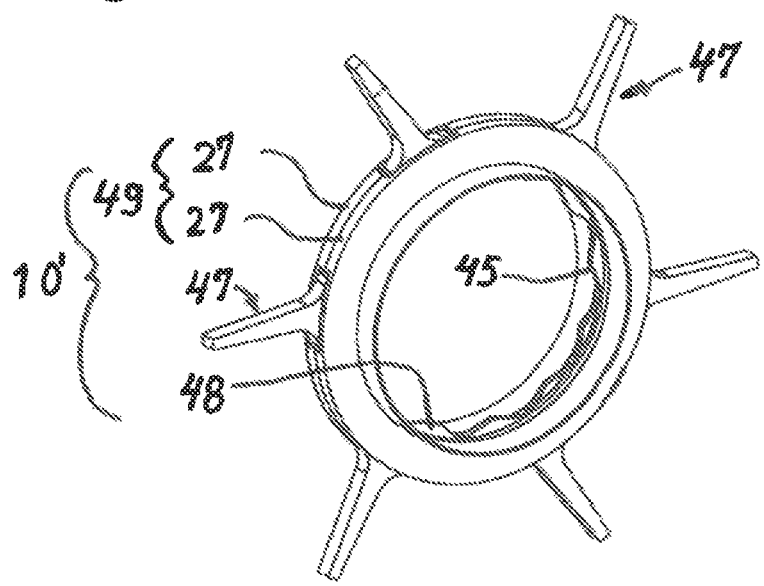
FIG. 9 shows a tine ring for a pick-up device with a polygonal drum.
Figure 10:
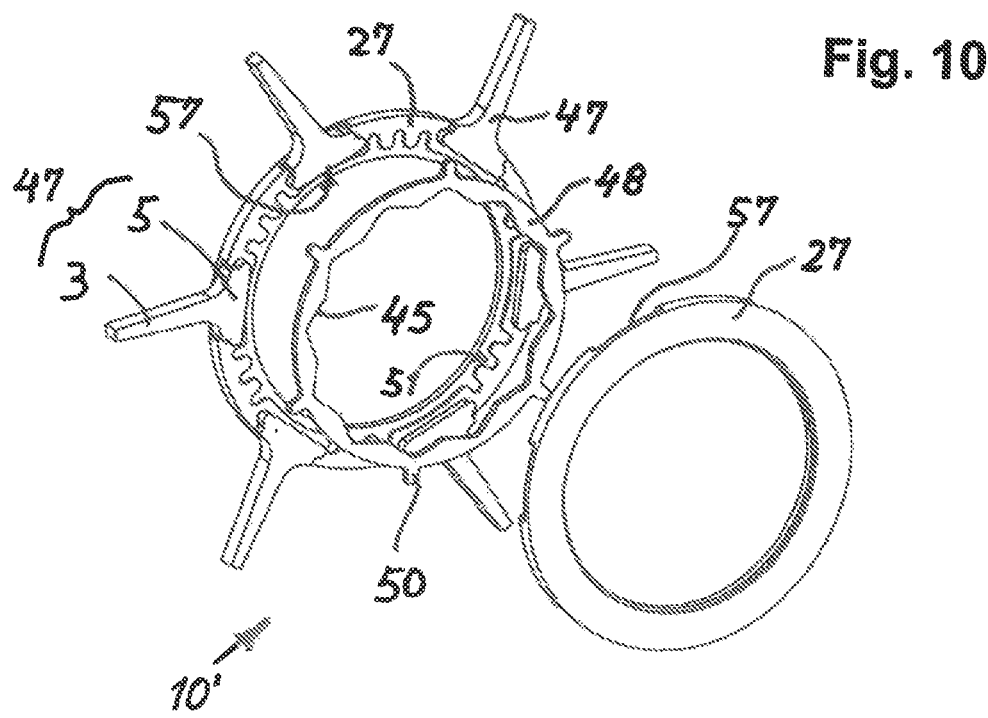
FIG. 10 shows the tine ring from FIG. 9 in an exploded illustration.

The tine ring 10' shown in FIGS. 9 and 10 comprises an outer ring 49 which is formed by two interconnected partial rings 27. Furthermore, the tine ring 10' comprises six tine segments 47 and an inner ring 48. The partial rings 27 and the tine segments 47 are produced from polyurethane. The partial rings 27 and therefore the outer ring 49 have recesses 57 for receiving the bases 5 of the tine segments 47. The bases 5 are accommodated in an interlocking manner in the recesses 57.

FIG. 10 also clarifies the construction of the inner ring 48 produced from steel. The inner ring 48 has a polygonal contour 45 which is compatible with the polygonal contour of a polygonal drum. Furthermore, the inner ring 48 has lug-like contour elements 50 which can engage in compatible contour elements 51 of the outer ring 49. In the exemplary embodiment illustrated, in each case three contour elements 51 are provided between in each case two recesses 57. As a result, the inner ring 48 can be attached in three different positions relative to the outer ring 49. Of course, other divisions are also possible.

The position of the feed tines 3 in relation to the drum 2 can therefore firstly be varied by the fact that the tine ring 10', or the polygonal profile 45 thereof, is first of all oriented by step-wise rotation prior to the installation into a desired position in relation to the drum 2. This variation possibility is furthermore simplified by the position of the inner ring 48 in relation to the outer ring 49 also being variable by means of the contour elements 50, 51. The described orientation options permit the arrangement of the feed tines 3 on the drum 2 in a multiplicity of positions. As already explained further above, the feed tines 3 can be oriented on the drum 2 with respect to winding lines and can thus be adapted to individual requirements.

The inner ring 48 shown in FIGS. 9 and 10 can be connected to the outer ring 49 non-releasably, for example by adhesive bonding or casting. Alternatively thereto, it is also possible to pull the outer ring 49, which has a certain elasticity, onto the substantially rigid inner ring 48 in a similar manner to a connection between tire and rim. In order to facilitate this installation work, it can be provided that the inner ring 48 is not of single-piece design, but rather comprises a number of partial segments 58. In the exemplary embodiment illustrated in FIG. 12, six partial segments 58 are provided which can be mounted at the designated position without deformation of the outer ring 49. After such a tine ring 10' has been mounted on a drum 2, the partial segments are supported in relation to the drum 2 both in the contour provided therefor of the outer ring and inward and are thereby securely fixed.

In the exemplary embodiment illustrated in FIGS. 9 and 10, the tine segments 47 are inserted in a substantially interlocking manner in tine rings 10. The inside diameter of the tine rings 10 is adapted to the outside diameter of the drum 2. In the exemplary embodiment illustrated in FIGS. 9 and 10, a drum 2 having a circular lateral surface 4 is provided. In order to prevent rotation of the tine rings 10 in relation to the drum 2, the tine rings 10 are welded to the drum 2. Of course, other means of securing against rotation are also possible, for example a screw connection or a drum with a polygonal lateral surface in combination with tine rings with polygonal inner surfaces (cf. FIG. 9, inner ring 48). The tine rings 10 have a closed contour with a substantially constant thickness, from which the feed tines 3 protrude.

Figure 11:
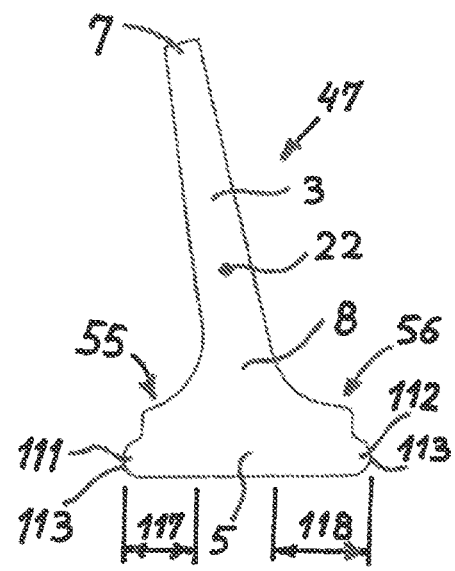
FIG. 11 shows a tine segment of a tine ring according to FIGS. 10 and 12.

FIG. 11 shows a tine segment 47 in detail. The tine segment 47 comprises a base 5 and a feed tine 3. The feed tines 3 can differ in design. In the exemplary embodiment illustrated, the feed tine 3 has a truncated tip 7 and a tine base 8 which faces away from the tip 7 and which merges in turn into the base 5. The feed tine 3 has the shape of a truncated obelisk 13 which tapers in the direction of the tip 7 and has two side surfaces 22 lying opposite each other and arranged parallel to each other. As an alternative thereto, the feed tine can also have, however, a different shape, for example a round or oval shape, preferably tapering conically toward the tine tip.

The base 5 forms a fastening region 101 which comprises two extension arms 55 and 56. The extension arm 55 is formed by that part of the base 5 which protrudes over the tine base 8 toward one side and the extension arm 56 is accordingly formed by that part of the base 5 which protrudes over the tine base toward the other side. The extension arm 55 therefore has a length 117 and the extension arm 56 a length 118.

Latching elements 111 and 112 are attached to the extension arms 55, 56. The latching elements 111, 112 have a rounded portion 113 which is provided to engage in a depression, compatible with the rounded portion, of a groove 54 provided in the tine ring 10, 10' or 10".

The tine segments 47 in the tine ring 10 are interchangeable. That is to say: a damaged or worn tine segment 47 can be taken out of the tine ring 10 when required and replaced by a new tine segment 47. During working use, that is to say, during conveying of harvested crop in the working direction of rotation 125, the feed tines 3 are loaded in a direction F1 (cf. FIG. 14). The base 5 is designed in such a manner that it is supported against the tine ring 10 during action of a force in the direction F1 and cannot be pressed out of the recess 57. During the reverse action of force in the direction F2, the elasticity of the base material permits a deformation which is sufficient in order to remove or to interchange the tine segment 47.

Figure 12:
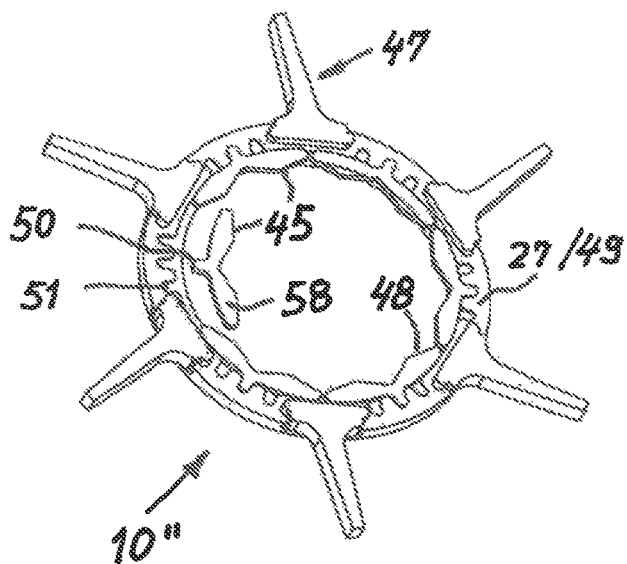
FIG. 12 shows a further embodiment of a tine ring with a segmented inner ring for a polygonal drum.

FIG. 12 shows six tine segments 47 which are inserted into a tine ring 10". Analogously to the tine ring 10', the tine ring 10" has an inner ring 48 with a polygonal contour 45, but the inner ring 48 is not in a single piece, but rather consists of partial segments 58. Inner ring 48 and outer ring 49 are connected in an interlocking manner to each other via lug-like contour elements 50, 51.

Figure 13:
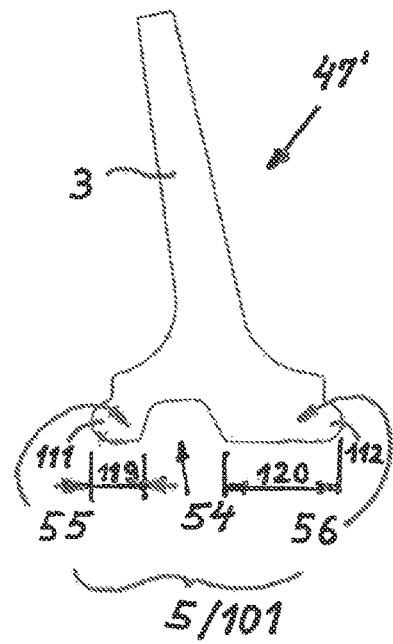
FIG. 13 shows a further embodiment of a tine segment.
Figure 14:
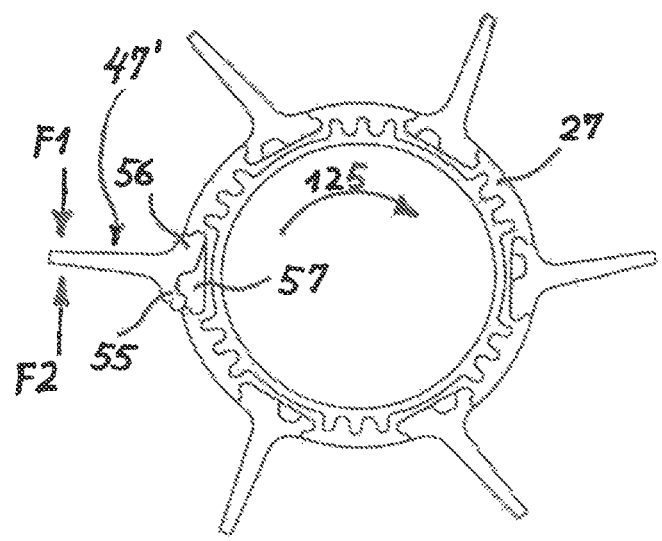
FIG. 14 shows a tine ring with a round inner contour for a round drum with tine segments according to FIG. 13.

Improved interchangeability is achieved by the use of tine segments 47' (cf. FIGS. 13 and 14). The tine segments 47' likewise have latching elements 111 and 112 with rounded portions 113. In contrast to the tine segments 47, the tine segments 47' on the lower side of the base 5 have a groove 54 which divides the base into the two extension arms 55 and 56. In the case of a tine segment with a groove 54, the extension arms 55 and 56 therefore in each case reach from the groove 54 as far as the outer edge of the base 5. The extension arm 55 has a length 119 and is shorter than the extension arm 56 with a length 120. The extension arm 55 is therefore relatively narrow and accordingly is easily deformable. During working use, i.e. during rotation of the drum 2 in the working direction of rotation 125, the force F1 exerted by the harvested crop acts on the tine segments 47'. During action of the force F1, the base 5 which is accommodated in the groove 54 is not deformed, but rather, on the contrary, is held securely. During an opposite action of force, namely in the direction F2, deformation of the extension arm 55 in the direction of the groove 54 can take place and the latching connection can be released. The tine segment 47' can thus be inserted into the recess 57 in the manner of a click connection and taken out again when required.

Figure 15:
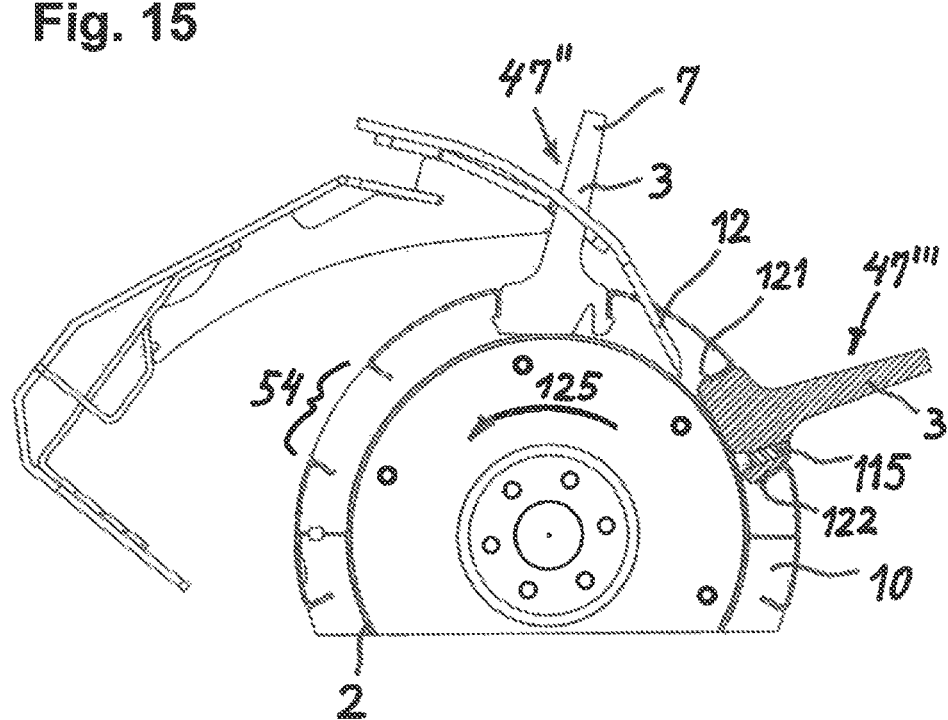
FIG. 15 shows a partial section of a further embodiment of a pick-up device.

FIG. 15 shows, in a simplified illustration, a drum 2 with a tine ring 10 in a sectional illustration. For a better view, a groove 54 is shown without an inserted tine segment, a tine segment 47" is inserted in a second groove 54, and a tine segment 47''' in a third recess.

The basic construction and the functioning of the tine segments 47" and 47''' correspond to the construction and the functioning of the tine segments 47 and 47'. The tine segments 47, 47', 47" and 47''' are manufactured in one material piece as a shaped part from a thermoplastic, elastomeric plastic, such as synthetic rubber, rubber or resin. The feed tines 3 are oriented in an inclined manner in relation to the base 5. The tine segments 47, 47', 47" and 47''' are arranged on the pick-up device 100 in such a manner that the tips 7 during working use, that is to say during rotation of the drum 2 in the working direction of rotation 125, are trailing.

As an alternative to the illustrated single-piece design of the tine segments 47, 47', 47" and 47''', a two-piece design comprising a base 5 and a feed tine 3 can also be provided (not illustrated). In such a design, a preferably releasable connection, for example in the form of a threaded connection, is provided between feed tine 3 and base 5.

Figure 16:
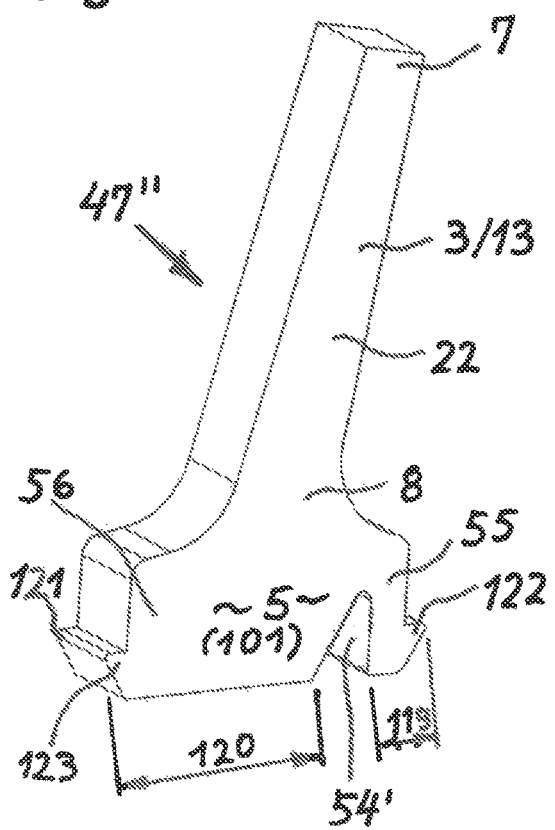
FIG. 16 shows a first of the tine segments illustrated in FIG. 15.

FIG. 16 shows the tine segment 47" which, in contrast to the tine segment 47', has a wedge-shaped groove 54' and latching elements 121 and 122 provided with prongs 123. By means of the geometrical configuration and arrangement of groove 54, 54' or of the latching elements 111, 112, 121 and 122, the response threshold, i.e. the size of the force requirement required in order to release the latching connection, can be set as required. In particular, two different response thresholds can be predefined depending on the direction of force in order to be able to securely hold the tine segment during an action of force in the one direction (working use) and in order to be able to easily fit and take out the tine segment during an action of force in the other direction (maintenance/removal).

Figure 17:
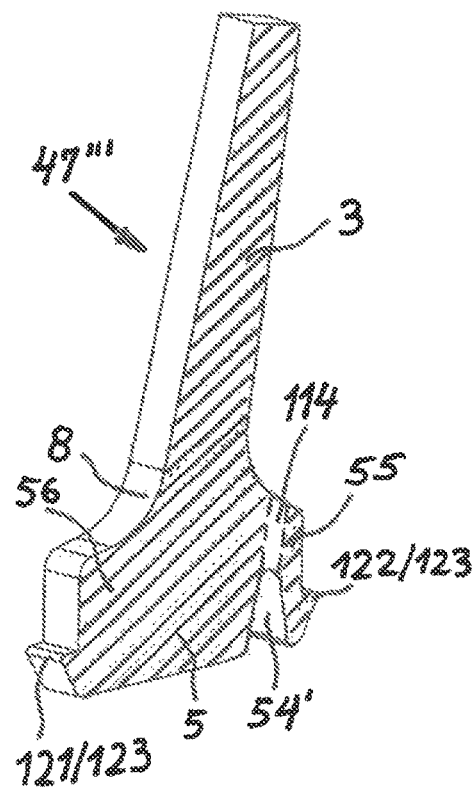
FIG. 17 shows a second of the tine segments illustrated in FIG. 15, in a perspective sectional illustration.

FIG. 17 shows a further embodiment of a tine segment 47'''. The tine segment 47''' has a bore 114 which emerges from the upper side of the base 5, i.e. from that side of the base from which the feed tine 3 protrudes, and reaches into the groove 54'. The tine segment 47''' can also be fitted and taken out analogously to the taking out and fitting already described. However, in the fitted state, a stopper 115 can be introduced through the bore 114 into the groove (cf. FIG. 15). The stopper which is introduced into the groove 54' blocks the free space formed by the groove and thus prevents the removal even during an action of force in the direction F2.

Such a blockage is then required if it is not possible to prevent a force acting in the direction F2 from being exerted on the tine segment under certain conditions, even during working use. Such use situations may occur, for example, if the direction of rotation of the pick-up drum is reversed in order, for example, to eliminate clogging. Furthermore, in particular during use of the tine segments according to the invention on a self-loading forage box pick-up device, cases may occur in which the tractor and the attached self-loading forage box move backwards for unloading into a silo and, during such a reversing travel, the tine segments are loaded counter to the customary load direction by harvested crop lying on the ground.

The stopper 115 may be a cylindrical dowel, for example made from a plastics material. However, a stopper with a thread, in particular a screw or a threaded pin with a hexagon socket, is particularly preferred. Although an internal thread can be provided in the bore 114, it is not absolutely necessary since the screw or the threaded pin can be simply knocked into the bore 114 given suitable dimensioning of the diameter of the bore 114. For removal purposes, the screw or the threaded pin can be unscrewed from the tine segment with a suitable tool. Since the screw or threaded pin material is harder than the plastics material selected for the tine segment, the thread present on the screw or the threaded pin cuts its own thread channel during the unscrewing process.

FIG. 18 shows a further embodiment of a pick-up device with encircling strippers 12'. The strippers are fastened with their one end to the frame 209 above the drum and with their other end below the drum 2. Tine rings 210 with tine segments 147 inserted therein are arranged on the drum 2. Fastening means which realize a combined latching/screw connection are provided between tine ring 210 and tine segment 147. The tine rings 210 are manufactured as a sheet-metal structure and are welded onto the drum 2. The tine rings 210 comprise support plates 206 attached perpendicularly to the drum 2, and carrier plates 205 placed thereon in a T-shaped manner (cf. FIG. 19). To facilitate the positioning of drum 2, carrier plate 205 and support plate 206, contour elements in the form of recesses 208 and projections 207 are provided on said individual parts. The support plates 206 thus have projections 207 which are insertable into recesses 208 provided for them in the drum 2 prior to the welding on. The carrier plates 205 also have recesses 208 which, in the exemplary embodiment illustrated, are in the manner of slots and through which corresponding projections 207 arranged on the support plates 206 reach.

Figure 19:
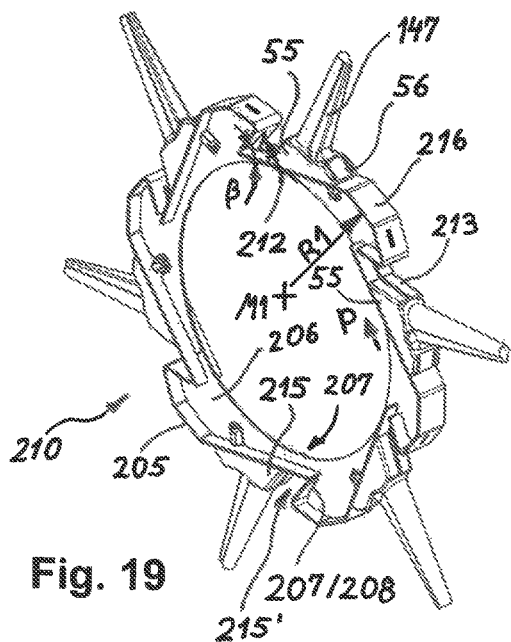
FIG. 19 shows one of the tine rings shown in FIG. 18 with tine segments at the moment at which the tine segments are plugged onto the tine ring.

The tine segments 147 are attached releasably to the carrier plates 205 (cf. FIG. 19). Encircling strippers 12' which are held by a frame 209 are located between the tine rings 147. Over an angle of approximately 180° in the front part of the drum 2, as seen in the direction of travel FA, the strippers 12' form a contour which loops in a semicircular manner around the drum and has an outer radius R2. The radius R2 is smaller than the outer radius R1 of the tine rings, said radius being formed by the carrier plates 205, or the surfaces 216 thereof. The surfaces 216 therefore protrude over the strippers 12' in the region in which the strippers 12' loop in a semicircular manner around the drum 2, that is to say: in the front region of the drum 2 as seen in the direction of travel FA. During harvesting use, the harvested crop flow therefore first of all strikes against the surfaces 216 of the rotating tine rings 210 and is thereby carried along. Also in this embodiment with encircling strippers 12', the tine rings 147 form contours which protrude over the drum diameter D and onto which the harvested crop is placed in the manner of a carpet during working use. The encircling strippers 147 and the partially encircling strippers 12" (cf. FIG. 21) also engage under the harvested crop analogously to the strippers attached in the shape of combs (cf. FIG. 3 and FIG. 7) and conduct said harvested crop further with little resistance.

Figure 20:
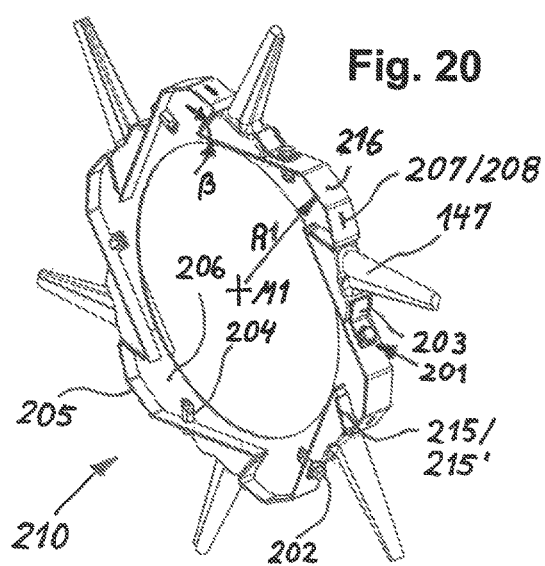
FIG. 20 shows the tine ring illustrated in FIG. 19 with tine segments completely plugged thereon and fixed thereto by screwing.

FIGS. 19 and 20 show one of the tine rings 210 shown in FIG. 18 and having tine segments 147. The tine segments 147 comprise two extension arms 55 and 56. The extension arm 55 has a wedge-shaped contour 215 which can be pushed into a likewise wedge-shaped contour 215' formed by the carrier plates 205. The extension arm 55 and the wedge-shaped contour 215 of the carrier plate 205 therefore have the same angle β. The extension arm 56 likewise has a wedge-shaped contour. As FIG. 20 shows, the extension arm 56 serves as a support for a holding plate 203 which is fixed with a screw 202 and a nut 204. Instead of screw 202 and nut 204, other removable fastening means can also be provided. A tine segment 147 is therefore installed by the tine segment 147 first of all being pushed into the wedge-shaped recess 215 in direction P (cf. FIG. 19). The end position is reached when the extension arm 55 makes contact with the carrier plate 205 and cannot be pushed further into the wedge-shaped recess 215'. To fix this position, the holding plate 203 is then placed on and fixed with the screw 202. FIG. 20 shows the tine ring 210 with the tine segments 147 which are located in the end position and are fixed there.

As FIG. 19 shows, the tine segment 147 also has, on its extension arm 55, a slot 213 which can be pushed onto a lug 212. The lug 212 is formed by a projecting length of the support plate 206 that projects through a slot of the carrier plate 205. The lug 212 which is located within the slot 213 in the mounted state blocks the possibility of movement of the tine segment 147 in the transverse direction and thus prevents the tine segment from breaking out in the event of possibly occurring transverse forces.

FIG. 21 shows a further embodiment of a pick-up device 100. Said pick-up device 100 comprises strippers 12" which partially loop around the drum 2. The strippers 12" are fixedly connected in the region of their beginning 218 to the frame 209. Starting from the beginning 218, they loop around the drum 2 and peter out in a free end 217. Analogously to the example illustrated in FIG. 18, the tine ring 210 has, in the front region of the pick-up device 100, as seen in the direction of travel FA, a radius R1 which reaches from the centerpoint M1 to the surface 216 and is greater than the radius R2 of the strippers. The harvested crop is therefore also grasped here by the projecting length of the tine ring 210 in relation to the stripper 12", accelerated and conveyed further with little resistance.

In the exemplary embodiment illustrated, the stripper 12" loops around the drum 2 by an angle α of approx. 100° with respect to a horizontal plane 222 which is defined by the centerpoints M1 of the tine rings 210 and M2 of the strippers 12". Of course, other looping-around angles are also possible. A region in which a straight line, which is defined by the centerpoint M1 of the tine ring 210 and the end 217, encloses an angle of 70° to 120° in relation to the horizontal plane 222 is particularly preferred.

Overall, the two embodiments illustrated in FIGS. 18 to 22 permit simple changing of individual tine segments 147 by only one single screw 202 having to be released or screwed on for the installation. The installation can take place without the strippers 12' or 12" or the tine rings 210 having to be released.

LIST OF REFERENCE SIGNS

1 Driveshaft
2 Drum
3 Feed tine
4 Lateral surface (of 2)
5 Base
6, 6' Shoulder
7 Tip (of 3)
8 Tine base
9 Bore
10, 10', 10" Tine ring
11 Intermediate space
12; 12', 12" Stripper
13 Obelisk
14 Supporting surface
15 Tine segment
16 Intermediate segment
17 Surface
18, 18' Arm (of 16)
19 Bore
20 Bore (in two steps)
21 Countersunk head screw
22 Lateral surface
23 -

24 -
25 -
26 -
27 Partial ring
28 Supply roller
29 Support wheel
30 CFS loading unit
31 Shaft
32 -
33 Inner surface
34 Step
35 -
36 Cutting device
37 Feed rotor
38 Tip (of 12)
39 Groove
40 -
41 -
42 -
43 -
44 -
45 Polygonal contour
47, 4', 47", 47''' Tine segment
48 Inner ring
49 Outer ring
50 Contour element (of 48)
51 Contour element (of 49)
52 -
53 -
54, 54' Groove
55 Extension arm
56 Extension arm
57 Recess
58 Partial segment
100 Pick-up device
101 Fastening region
111 Latching element
112 Latching element
113 Rounded portion
114 Bore
115 Stopper
116 -
117 Length
118 Length
119 Length
120 Length
121 Latching element
122 Latching element
123 Prong
124 -
125 Working direction of rotation
147 Tine segment
200 Harvesting machine
201 Screw connection
202 Screw
203 Holding plate
204 Nut
205 Carrier plate
206 Support plate
207 Projection (on 206)
208 Recess
209 Frame
210 Tine ring
211 -
212 Lug
213 Slot
214 Receptacle (for 147)
215, 215' Contour
216 Surface (of 205)
217 End (of 12")
218 Beginning (of 12")
219 Horizontal straight line (through M1, M2)
220 Straight line (through M1, M2 and 217)
L Drum length
F1 Direction of force
F2 Direction of force
FA Direction of travel
D Outside diameter (of 2)
P Direction
β Angle
α Angle
M1 Centerpoint (of 210)
M2 Centerpoint (of the strippers)
R1 Radius (of 210)
R2 Radius (of 12'

The invention claimed is:

1. A rotatable pick-up device (100), which is installed or installable in an agricultural harvesting machine (200), for harvested crop, comprising:
   a) a roller-shaped drum (2) with an outer lateral surface (4) which has an outside diameter (D);
   b) a multiplicity of tine rings (10; 10'; 10"; 210) which are arranged on the outer lateral surface (4) of the drum (2) and protrude over the outside diameter (D) of the drum (2);
   c) strippers (12; 12'; 12"), wherein intermediate spaces (11) for receiving the strippers (12; 12'; 12") are provided between adjacent tine rings (10; 10'; 10"; 210); and
   d) tine segments (15; 47; 47'; 47"; 47'''; 147), wherein the tine rings (10; 10'; 10"; 210) comprise the tine segments (15; 47; 47'; 47"; 47'''; 147) which, in a mounted state, are arranged entirely above the lateral surface (4) and are manufactured from an elastic plastic,
   wherein
   the tine rings (10; 10'; 10"; 210) and the tine segments (15; 47; 47'; 47"; 47'''; 147) comprise mutually complementary fastening means, by means of which the tine segments (15; 47; 47'; 47"; 47'''; 147) are mounted on the tine ring (10; 10'; 10"; 210) without the tine ring (10; 10'; 10"; 210) being removed, and
   the tine rings (10; 10'; 10"; 210) each have a radius (R1) which is greater than a radius (R2) of the strippers (12; 12'; 12") in a front region of the pick-up device (100), as seen in a direction of travel (FA), and therefore, when the pick-up device (100) is in working use, the harvested crop to be picked up first of all makes contact with the rotating tine rings (10; 10'; 10"; 210) and is carried along by the rotating tine rings (10; 10'; 10"; 210) before said harvested crop makes contact with the strippers (12; 12'; 12").

2. The pick-up device (100) as claimed in claim 1, wherein the fastening means of the tine rings (10; 10'; 10"; 210) and the tine segments (15; 47; 47'; 47"; 47'''; 147) is a screw connection.

3. The pick-up device (100) as claimed in claim 1, wherein the fastening means of the tine rings (10; 10'; 10"; 210) and the tine segments (15; 47; 47'; 47"; 47'''; 147) is a latching connection.

4. The pick-up device (100) as claimed in claim 1, wherein the fastening means of the tine rings (10; 10'; 10"; 210) and the tine segments (15; 47; 47'; 47"; 47'''; 147) is a combined latching and screw connection.

5. The pick-up device (100) as claimed in claim 1, wherein each of the tine rings (210) comprises support plates (206) and carrier plates (205), wherein the support plates (206) are arranged perpendicularly in relation to the drum (2) and, together with the carrier plates (205), form a T-shaped contour protruding over the drum (2).

6. The pick-up device (100) as claimed in claim 1, wherein the tine ring (210) forms an annular contour with wedge-shaped receptacles (214) for the tine segments (147).

7. The pick-up device as claimed in claim 1, wherein each of the strippers (12"):
has a beginning (218) and a free end (217);
is coupled on a side near the beginning (218) to the frame (209) directly or by means of connecting components; and
loops around the drum (2) at least to an extent such that the free end (217) cuts through a horizontal plane (222) defined by centerpoints (M1) of the tine rings (210).

8. The pick-up device as claimed in claim 7, wherein the free end (217) of each of the strippers (12") loops around the drum (2) starting from the horizontal plane (222) by an angle (a) which is selected from the group of angle ranges consisting of: 0° to 160°, 40° to 120°, and 70° to 120°.

9. A tine segment (15; 47; 47'; 47"; 47'''; 147) for a pick-up device (100) on an agricultural machine, wherein:
a) the tine segment (15; 47; 47'; 47"; 47'''; 147) is produced from an elastic plastics material;
b) the tine segment (15; 47; 47'; 47"; 47'''; 147) comprises a base (5) with a fastening region (101) for connecting the tine segment (15; 47; 47'; 47"; 47'''; 147) to a tine ring (10; 10'; 10"; 210), and at least one feed tine (3) protruding from the base (5);
c) the tine segment (15; 47; 47'; 47"; 47'''; 147) is mounted on the tine ring (10; 10'; 10"; 210) by means of a combined latching connection and screw connection on the base (5) without the tine ring (10; 10'; 10"; 210) being removed from the agricultural machine;
d) the fastening region (101) comprises two extension arms (55, 56) and at least one latching element (111, 112; 121, 122) for producing the latching connection between the tine segment (15; 47; 47'; 47"; 47'''; 147) and the tine ring (10; 10'; 10"; 210); and
e) the pick-up device (100) comprises the tine ring (10; 10'; 10"; 210) and is provided for picking up harvested crop lying on the ground,
wherein the base (5) comprises at least one groove (54; 54') which divides the base (5) into the two extension arms (55, 56) such that, when a force acts on at least one of the extension arms (55, 56) in the direction of the at least one groove (54; 54'), the deformability of at least one of the extension arms (55, 56) is facilitated.

10. The tine segment (15; 47'; 47"; 47''') as claimed claim 9, further comprising a bore (114) opening into the at least one groove (54; 54'), the bore (114) being provided in the base (5), for receiving a stopper (115) blocking the deformability of at least one of the extension arms (55, 56).

11. A tine segment (15; 47; 47'; 47"; 47'''; 147) for a pick-up device (100) on an agricultural machine, wherein:
a) the tine segment (15; 47; 47'; 47"; 47'''; 147) is produced from an elastic plastics material;
b) the tine segment (15; 47; 47'; 47"; 47'''; 147) comprises a base (5) with a fastening region (101) for connecting the tine segment (15; 47; 47'; 47"; 47'''; 147) to a tine ring (10; 10'; 10"; 210), and at least one feed tine (3) protruding from the base (5);
c) the tine segment (15; 47; 47'; 47"; 47'''; 147) is mounted on the tine ring (10; 10'; 10"; 210) by means of a combined latching connection and screw connection without the tine ring (10; 10'; 10"; 210) being removed from the agricultural machine;
d) the fastening region (101) comprises two extension arms (55, 56) and at least two latching elements (111, 112; 121, 122) for producing the latching connection between the tine segment (15; 47; 47'; 47"; 47'''; 147) and the tine ring (10; 10'; 10"; 210);
e) the pick-up device (100) comprises the tine ring (10; 10'; 10"; 210) and is provided for picking up harvested crop lying on the ground; and
f) the at least two latching elements (111, 112; 121, 122), have different response thresholds, the at least two latching elements (111, 112; 121, 122) being provided on the tine segment (15; 47; 47'; 47"; 47''') such that, when the tine segment (15; 47; 47'; 47"; 47''') is mounted on the tine ring (10; 10'; 10"; 210), the tine segment (15; 47; 47'; 47"; 47''') is releasable from the pick-up device (100) depending on the direction of action of a force (F1, F2) acting on the tine segment (15; 47; 47'; 47"; 47''').

12. A tine segment (15; 47; 47'; 47"; 47'''; 147) for a pick-up device (100) on an agricultural machine, wherein:
a) the tine segment (15; 47; 47'; 47"; 47'''; 147) is produced from an elastic plastics material;
b) the tine segment (15; 47; 47'; 47"; 47'''; 147) comprises a base (5) with a fastening region (101) for connecting the tine segment (15; 47; 47'; 47"; 47'''; 147) to a tine ring (10; 10'; 10"; 210), and at least one feed tine (3) protruding from the base (5);
c) the tine segment (15; 47; 47'; 47"; 47'''; 147) is mounted on the tine ring (10; 10'; 10"; 210) by means of a combined latching connection and screw connection without the tine ring (10; 10'; 10"; 210) being removed from the agricultural machine;
d) the fastening region (101) comprises two extension arms (55, 56) and at least one latching element (111, 112; 121, 122) for producing the latching connection between the tine segment (15; 47; 47'; 47"; 47'''; 147) and the tine ring (10; 10'; 10"; 210); and
e) the pick-up device (100) comprises the tine ring (10; 10'; 10"; 210) and is provided for picking up harvested crop lying on the ground,
wherein the tine segment (147) comprises a slot (213) which can be plugged onto a lug (212) provided on the tine ring (210), and therefore an interlocking connection can be produced between the tine segment (147) and the tine ring (210).

* * * * *